Oct. 26, 1926.
H. F. SLOCUM
EXPANSION BOLT
Filed June 18, 1925
1,604,762
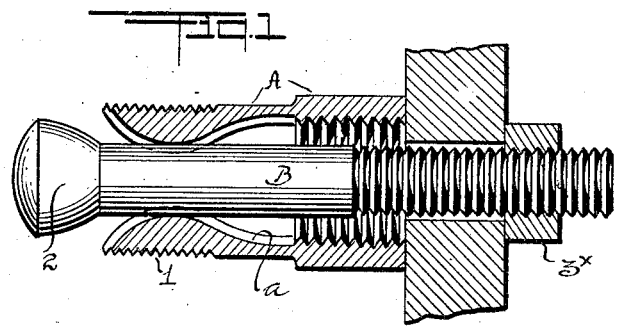
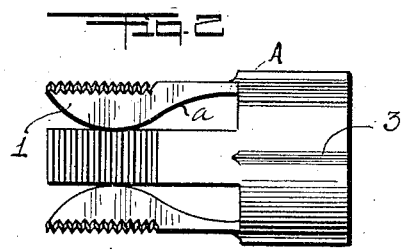
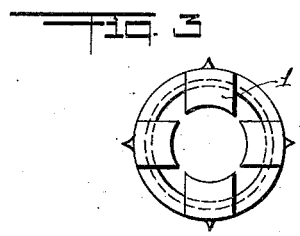
INVENTOR
Harvey F. Slocum
BY
ATTORNEY Patented Oct. 26, 1926.

1,604,762

UNITED STATES PATENT OFFICE.

HARVEY F. SLOCUM, OF LONG BRANCH, NEW JERSEY.

EXPANSION BOLT.

Application filed June 18, 1925. Serial No. 37,886.

The object of my invention is to provide an expansion bolt formed of two units, each of which may be a casting of malleable iron, brass or any material of required flexibility. One of the units comprises an expansion member and the second unit comprises a specially designed bolt for operating the expansion member.

The invention will be understood by reference to the accompanying drawing, in which—

Figure 1 is a longitudinal cross section through an embodiment of the invention;

Figure 2 is a side elevation of the expansion member illustrated in Figure 1;

Figure 3 is a front end view of the expansion member.

By reference to Figure 1 of the drawings, it will be seen that the embodiment therein shown comprises an expansion member A having a cylindrical base and a plurality of projecting claws 1, in this instance four, each being formed with gripping teeth on its outer surface and with an inner cam face $a$. The base of the expansion member is formed with a central aperture to receive the operating or expanding bolt B.

In the embodiment of the invention illustrated, bolt B is inserted in the expansion member A at the front end thereof and is formed with a ball shaped head 2 and with a threaded shank to receive a nut $3^x$.

It will be understood that when the expansion member A is inserted within a suitable aperture formed in one of the members to be united by the device, the ribs 3 thereon will engage the walls of said opening and will hold the said unit against rotation. Assuming that the threaded end of bolt B extends through a suitable aperture formed in the second of the two members to be united by the device, rotation of nut $3^x$ will draw bolt B lengthwise until head 2 engages the cam faces $a$ of the projecting claws 1 and the latter will be moved outwardly so as to securely lock expansion unit A to the member in which it is seated.

Having described my invention what I claim and desire to secure by Letters Patent is as follows:—

An expansion bolt consisting of a shell of hard metal comprising an integral cylindrical base carrying a plurality of projecting claws, each claw having an intermediate high point, the high point being at the inner face of the claw, the claws being spaced and affording a passage axially thereof to permit their outward expansion by movement of an expanding bolt, and an expanding bolt having an approximately frusto-conical head said bolt being provided with means for causing its movement longitudinally of the shell to cause said head portion to engage said high point by movement toward the base.

In testimony whereof, I have signed my name to this specification.

HARVEY F. SLOCUM.